(12) United States Patent
Tang et al.

(10) Patent No.: US 9,953,660 B2
(45) Date of Patent: Apr. 24, 2018

(54) SYSTEM AND METHOD FOR REDUCING TANDEMING EFFECTS IN A COMMUNICATION SYSTEM

(71) Applicant: Nuance Communications, Inc., Burlington, MA (US)

(72) Inventors: Qian-Yu Tang, Milpitas, CA (US); Victor Zeyliger, Redwood City, CA (US); Constantine V. Skidanenko, San Jose, CA (US)

(73) Assignee: Nuance Communications, Inc., Burlington, MA (US)

( * ) Notice: Subject to any disclaimer, the term of this patent is extended or adjusted under 35 U.S.C. 154(b) by 26 days.

(21) Appl. No.: 14/463,294

(22) Filed: Aug. 19, 2014

(65) Prior Publication Data

US 2016/0055858 A1 Feb. 25, 2016

(51) Int. Cl.
*G10L 19/12* (2013.01)
*G10L 19/16* (2013.01)
*H04W 76/04* (2009.01)
*G10L 19/26* (2013.01)
*G10L 19/08* (2013.01)

(52) U.S. Cl.
CPC ............. *G10L 19/12* (2013.01); *G10L 19/16* (2013.01); *G10L 19/173* (2013.01); *G10L 19/26* (2013.01); *H04W 76/048* (2013.01); *G10L 19/08* (2013.01)

(58) Field of Classification Search
CPC .............................. G10L 19/173; G10L 19/12
See application file for complete search history.

(56) References Cited

U.S. PATENT DOCUMENTS

| 5,265,190 A * | 11/1993 | Yip | G10L 19/09 704/219 |
| 6,041,297 A * | 3/2000 | Goldberg | G10L 19/12 704/219 |
| 6,842,733 B1 * | 1/2005 | Gao | G10L 19/18 704/203 |
| 7,016,831 B2 * | 3/2006 | Suzuki | G10L 19/16 704/203 |
| 7,171,354 B1 * | 1/2007 | Yoshida | G10L 19/005 704/219 |
| 8,639,519 B2 * | 1/2014 | Ashley | G10L 19/24 704/500 |

(Continued)

OTHER PUBLICATIONS

Peinado, Antonio M., and Segura, Jose C., "Speech Recognition Over Digital Channels, Robustness and Standards," John Wiley & Sons Ltd., pp. 102-103 (2006).

(Continued)

*Primary Examiner* — Paras D Shah
*Assistant Examiner* — Bryan S Blankenagel
(74) *Attorney, Agent, or Firm* — Brian J. Colandreo; Michael T. Abramson; Holland & Knight LLP

(57) ABSTRACT

The present disclosure is directed towards a system and method for reducing tandeming effects in a communications system. The method may include receiving, at a speech decoder, an input bitstream associated with an incoming initial speech signal from a speech encoder. The method may further include determining whether or not coding is required and if coding is required, modifying an excitation signal associated with the bitstream. The method may also include providing the modified excitation signal to an adaptive encoder.

11 Claims, 12 Drawing Sheets

(56) References Cited

U.S. PATENT DOCUMENTS

| | | | | |
|---|---|---|---|---|
| 2003/0065508 A1* | 4/2003 | Tsuchinaga | ............ | G10L 19/012 704/215 |
| 2003/0125960 A1* | 7/2003 | Chu | .................... | H04W 88/181 704/500 |
| 2003/0215011 A1* | 11/2003 | Wang | .................... | H04N 19/176 375/240.03 |
| 2004/0024594 A1* | 2/2004 | Lee | ......................... | G10L 19/10 704/219 |
| 2004/0111257 A1* | 6/2004 | Sung | .................... | G10L 19/173 704/219 |
| 2004/0117176 A1* | 6/2004 | Kandhadai | .............. | G10L 19/12 704/223 |
| 2004/0158463 A1* | 8/2004 | Jabri | ..................... | G10L 19/173 704/219 |
| 2004/0210440 A1* | 10/2004 | Lashkari | ................. | G10L 19/07 704/264 |
| 2005/0053130 A1* | 3/2005 | Jabri | ....................... | G10L 19/12 375/240 |
| 2006/0224389 A1* | 10/2006 | Murashima | ............ | G10L 19/173 704/267 |
| 2007/0156395 A1* | 7/2007 | Ojala | ..................... | G10L 19/06 704/211 |
| 2007/0299660 A1* | 12/2007 | Yoshida | ................. | G10L 19/012 704/220 |
| 2008/0275698 A1* | 11/2008 | Yasunaga | ............. | G10L 19/135 704/222 |
| 2009/0083041 A1* | 3/2009 | Yoshida | ................. | G10L 19/008 704/500 |
| 2009/0232252 A1* | 9/2009 | Kim | ......................... | H04L 27/34 375/298 |
| 2009/0326930 A1* | 12/2009 | Kawashima | .......... | G10L 19/005 704/207 |
| 2010/0185440 A1* | 7/2010 | Bao | ...................... | H04W 88/181 704/203 |
| 2011/0173004 A1* | 7/2011 | Bessette | ................ | G10L 19/005 704/500 |
| 2013/0054230 A1* | 2/2013 | Thepie Fapi | ........... | H04M 3/56 704/219 |

OTHER PUBLICATIONS

3rd Generation Partnership Project; Technical Specification Group Services and System Aspects; Mandatory Speech Codec Speech Processing Functions; Adaptive Multi-Rate (AMR) speech codec; Transcoding functions (Release 10); 3GPP TS 26.090 V10.0.0,(Mar. 2011) (55 pages).

3rd Generation Partnership Project; Technical Specification Group Services and System Aspects; ANSI C code for the Adaptive Multi Rate (AMR) speech codec (Release 10); 3GPP TS 26.073 V10.0.0 (Mar. 2011) (25 pages).

Digital cellular telecommunications system (Phase 2+); Half rate speech; Half rate speech transcoding (GSM 06.20 version 8.0.1 Release 1999); ETSI EN 300 969 V8.0.1 (Nov. 2000) (47 pages).

Digital cellular telecommunications system (Phase 2+); Half rate speech; ANSI-C code for the GSM half rate speech codec (GSM 06.06 version 8.0.1 Release 1999); ETSI EN 300 967 V8.0.1 (Nov. 2000) (15 pages).

Coding of speech at 8 kbit/s using conjugate-structure algebraic-code-excited linear prediction (CS-ACELP);Series G: Transmission Systems and Media, Digital Systems and Networks Digital terminal equipments—Coding of analogue signals by methods other than PCM; Telecommunication Standardization Sector of ITU (Jan. 2007).

\* cited by examiner

SYSTEM AND METHOD FOR REDUCING TANDEMING EFFECTS IN A COMMUNICATION SYSTEM

TECHNICAL FIELD

This disclosure relates to communications systems and, more particularly, to a system and method for reducing tandeming effects in a communication system.

BACKGROUND

In the areas of telephony, data networking, and telecommunications there has been a shift from analog to digital, wired to wireless, and a continuous migration of some voice calls from conventional time division multiplexing ("TDM") networks to packet based internet protocol ("IP") networks. In a typical communication application such as a wireless cellular system and Voice over Internet Protocol ("VoIP") system, the speech signal might be encoded and decoded several times.

Codec tandeming is a challenging problem in the field of voice quality assurance ("VQA"). The voice quality degradation due to codec tandeming has been a significant problem over the past few decades in the fields of speech coding, speech recognition, and voice enhancement.

If the same coder is involved, it is generally referred to as self-tandeming. If other coders are involved, it is generally referred to as cross-tandeming. In the case of self-tandeming of two G.729 coders as an example, typical voice quality degradation in terms of the Perceptual Evaluation of Speech Quality ("PESQ") mean opinion score ("MOS") for a clean speech file is about 0.2 to 0.5 depending on the test speech files.

Due to the voice quality degradation caused by codec tandeming, the effect on codec tandeming over speech recognition accuracy has been widely studied. It is noted that for medium bit rate or low bit rate coders below 13 kbps, the speech recognition accuracy rate is significantly impacted by codec tandeming. For example, for an FS-1016 CELP coder with a 4.8 kbps bit rate the speech recognition word accuracy rate is decreased from 81.86% for one coder to 41.54% for five coders in tandem. The word error rate ("WER") for clean speech using a GSM Full Rate ("GSM-FR") coder with a bit rate of 13 kbps is changed from 13.30% for one coder to 23.75% for three coders in tandem.

SUMMARY OF DISCLOSURE

In one implementation, a computer-implemented method for reducing tandeming effects in a communications system is provided. The method may include receiving, at a speech decoder, an input bitstream associated with an incoming initial speech signal from a speech encoder. The method may further include determining whether or not coding is required. If coding is required, the method may include modifying an excitation signal associated with the bitstream. The method may also include providing the modified excitation signal to an adaptive encoder.

One or more of the following features may be included. In some embodiments, the method may include decoding T-milliseconds codec frames of the input bitstream that was encoded by a code excited linear prediction ("CELP") based encoder at a rate of S kilobits/second for an adaptive encoder. The method may further include calculating a total excitation signal u(n) by adding an adaptive and a fixed codebook vector, each scaled by a respective gain. The method may also include saving the total excitation signal u(n) at an adaptive encoder memory, wherein at least one of the adaptive codebook vector and the fixed codebook vector include speech frames and discontinuous transmission ("DTX") frames based on a CELP-based standard. In some embodiments, the adaptive encoder may include an adaptive encoder memory configured to store a defined data structure. The method may further include calculating a new excitation signal e1(n) for a new speech signal s(n) after VQA processing has been performed. The method may also include calculating a total excitation signal e2(n) for a speech signal sp(n) before VQA. The method may include calculating a distance over signal ("DOS") ratio "R" between the new excitation signal e1(n) and the total excitation signal e2(n). The method may further include deciding whether an original input stream to a partial decoder is copied to an output of an adaptive encoder using an adaptive coding algorithm. The method may also include performing adaptive excitation synchronization based upon, at least in part, a final decision flag decision generated by the adaptive coding algorithm. The method may include disabling a post-processing option including a high-pass filter in a partial decoder, wherein disabling is configured to avoid codec tandeming.

In another implementation, a computer-implemented method for reducing tandeming effects in a communications system is provided. The method may include receiving, at an adaptive encoder, an input signal sampled at a rate of S kilobits per second. The method may further include adaptively coding T-milliseconds codec frames of the input signal without any resulting voice quality degradation from codec tandeming, wherein the adaptive encoder includes an adaptive encoder memory having a defined data structure.

One or more of the following features may be included. In some embodiments, the method may include removing a delay introduced in a CELP-based coder, where a present frame defined in a typical CELP-based coder for a speech vector is changed to at least one of a new frame or a latest speech frame, to avoid codec tandeming. The method may further include disabling a pre-processing module including a high-pass filter, to avoid codec tandeming. The method may also include saving at least one original encoded LPC bit from an input bit stream to the adaptive encoder memory. The method may further include saving at least one decoded LP parameter including interpolated Â(z) coefficients per sub-frame and line spectral pair (LSP) parameters per codec frame in the adaptive encoder memory. The method may also include copying the at least one original encoded LPC bit from the adaptive encoder memory to an adaptive encoder output. The method may further include copying the at least one decoded LP parameter including the interpolated Â(z) coefficients per sub-frame and line spectral pair (LSP) parameters per codec frame from the adaptive encoder memory so that the local LP analysis results are not required. The method may also include updating at least one state of a synthesis filter and a weighting filter using an equivalent implementation for computing a target signal.

In yet another implementation, a system configured to reduce tandeming effects is provided. The system may include one or more processors configured to one or more operations. Some operations may include receiving, at a speech decoder, an input bitstream associated with an incoming initial speech signal from a speech encoder and determining whether or not coding is required. If coding is required, operations may include modifying an excitation signal associated with the bitstream and providing the modified excitation signal to an adaptive encoder.

One or more of the following features may be included. In some embodiments, the operations may include decoding T-milliseconds codec frames of the input bitstream that was encoded by a code excited linear prediction ("CELP") based encoder at a rate of S kilobits/second for an adaptive encoder. Operations may further include calculating a total excitation signal u(n) by adding an adaptive and a fixed codebook vector, each scaled by a respective gain. Operations may also include saving the total excitation signal u(n) at an adaptive encoder memory, wherein at least one of the adaptive codebook vector and the fixed codebook vector include speech frames and discontinuous transmission ("DTX") frames based on a CELP-based standard.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION

Embodiments provided herein are directed towards a system and method for reducing tandeming effects in a communication system. Voice quality assurance (VQA) uses vocoding to increase the intelligibility of VoIP signals. As discussed above, communication systems may suffer from tandeming, which occurs when speech is encoded by one speech codec, decoded, and re-encoded with another codec. Embodiments of tandeming reduction process 10 may be configured to reduce the effect of tandeming. This may be achieved by avoiding coding when it is not necessary, and, when it is necessary by modifying the excitation signal to the adaptive encoder so as to minimize the tandeming effect. When to trigger this re-computation of the excitation signal may be controlled by tests of the distance between the original excitation signal and the new excitation signal. Regardless of coding and not coding, the encoder excitation signal may be synchronized by using a new method of adaptive excitation synchronization as is discussed in further detail hereinbelow.

Figure 1:
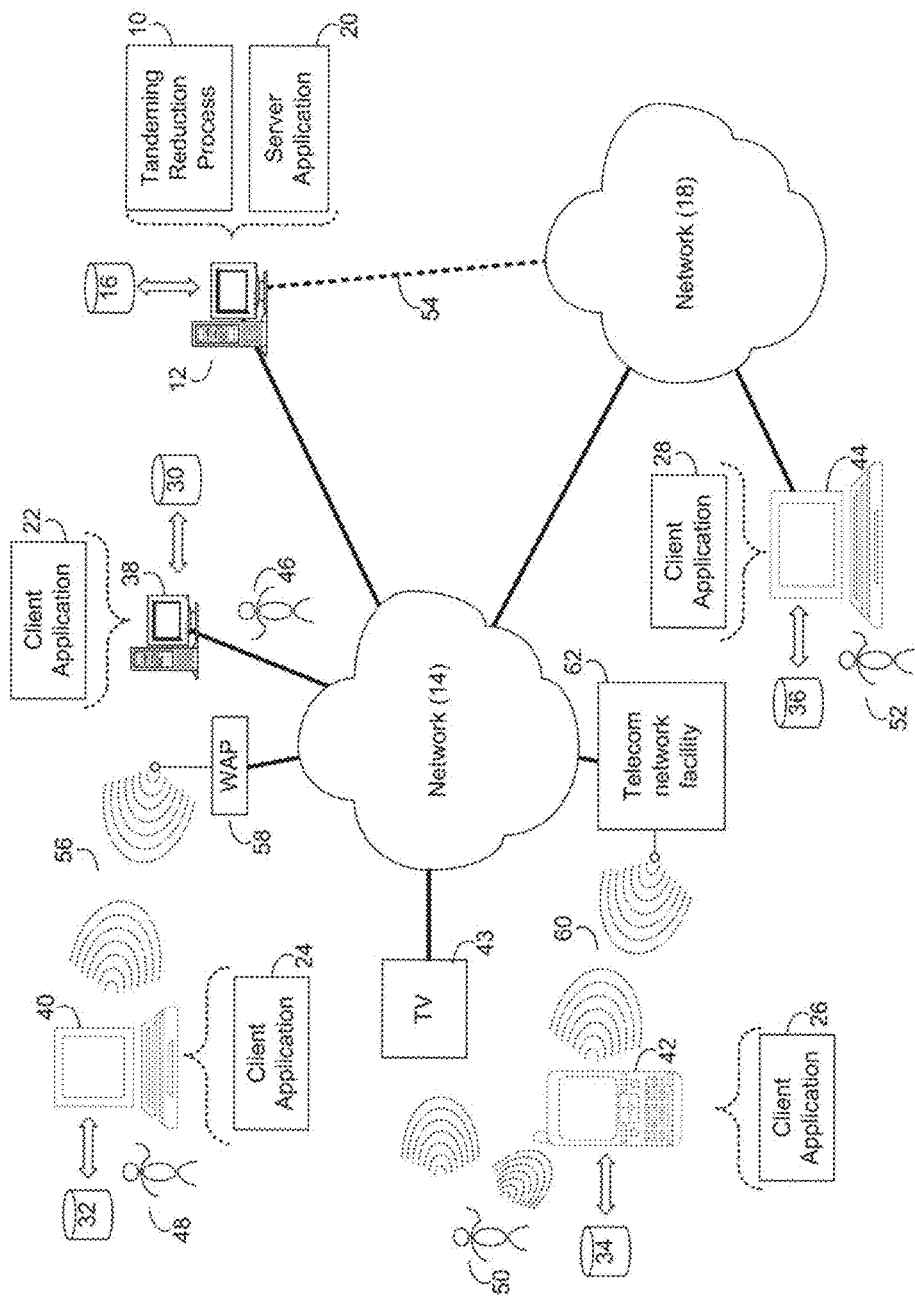
FIG. 1 is a diagrammatic view of a tandeming reduction process in accordance with an embodiment of the present disclosure.
Figure 2:
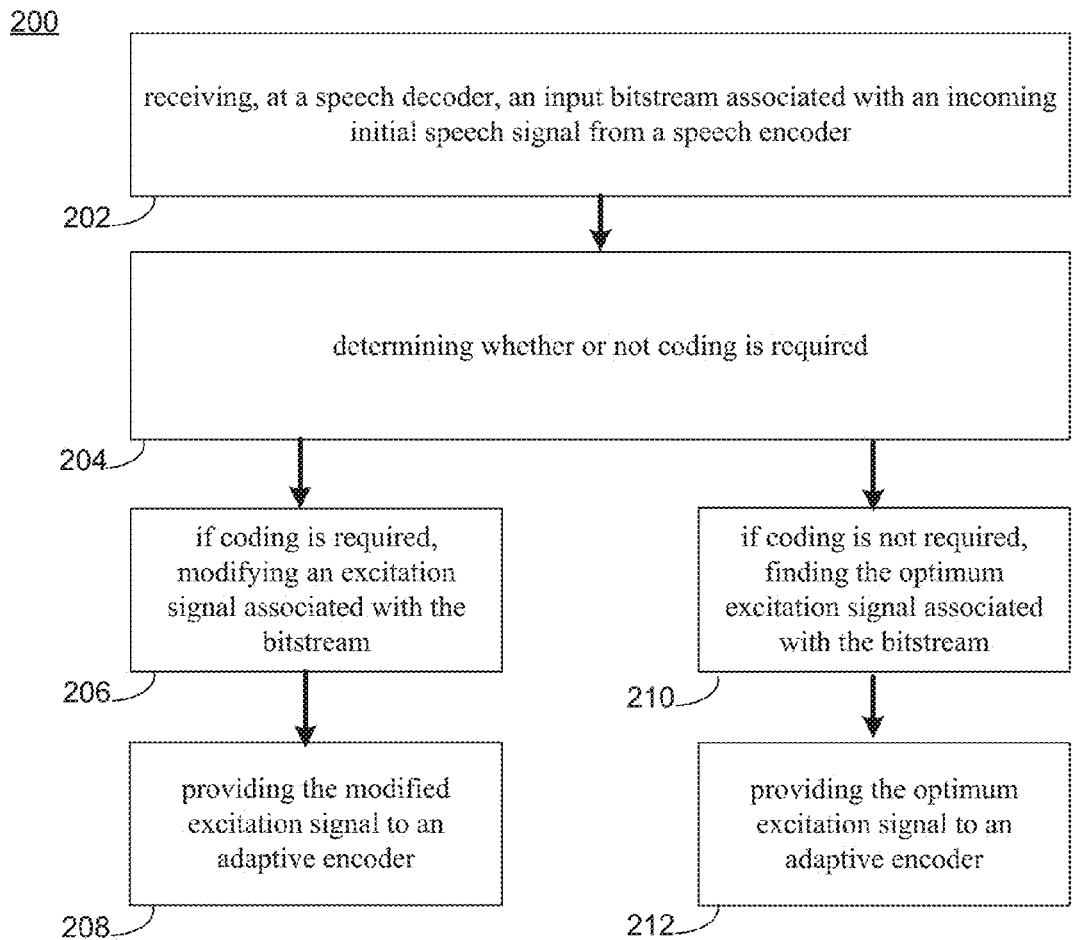
FIG. 2 is a flowchart of a tandeming reduction process in accordance with an embodiment of the present disclosure.

Referring to FIG. 1, there is shown a tandeming reduction process 10 that may reside on and may be executed by computer 12, which may be connected to network 14 (e.g., the Internet or a local area network). Server application 20 may include some or all of the elements of tandeming reduction process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail in FIGS. 2-12, tandeming reduction process 10 may include receiving (202), at a speech decoder, an input bitstream associated with an incoming initial speech signal from a speech encoder. The method may further include determining (204) whether or not coding is required and if coding is required, modifying (206) an excitation signal associated with the bitstream. The method may include providing (208) the modified excitation signal to an adaptive encoder. If coding is not required, the method may include finding (210) the optimum excitation signal associated with the bitstream. The method may also include providing (212) the optimum excitation signal to an adaptive encoder.

The instruction sets and subroutines of tandeming reduction process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, tandeming reduction process 10 may reside in whole or in part on one or more client devices and, as such, may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), and a dedicated network device (not shown).

One or more of client applications 22, 24, 26, 28 may be configured to effectuate some or all of the functionality of tandeming reduction process 10. Accordingly, tandeming reduction process 10 may be a purely server-side application, a purely client-side application, or a hybrid server-side/client-side application that is cooperatively executed by one or more of client applications 22, 24, 26, 28 and tandeming reduction process 10.

Client electronic devices 38, 40, 42, 44 may each execute an operating system, examples of which may include but are not limited to Apple iOS™, Microsoft Windows™, Android™, Redhat Linux™, or a custom operating system.

Users 46, 48, 50, 52 may access computer 12 and tandeming reduction process 10 directly through network 14 or through secondary network 18. Further, computer 12 may be connected to network 14 through secondary network 18, as illustrated with phantom link line 54. In some embodiments, users may access tandeming reduction process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14.

In some embodiments, some or all of the devices shown in FIG. 1 may be or may include encoders, decoders, or any combination thereof. The term "codec" as used herein may refer to a device or computer program capable of encoding and/or decoding a digital data stream or signal.

As discussed above, in a typical communication application (e.g., wireless cellular systems and VoIP systems), a speech signal might be encoded and decoded several times. VQA may use vocoding to increase the intelligibility of VoIP signals. The signal may suffer from tandeming, which may occur when speech is encoded by one speech codec, decoded, and re-encoded with another codec.

Embodiments of tandeming reduction process 10 may generally relate to the field of speech coding algorithms that may use a CELP architecture. Some of these may include, but are not limited to, i) FS-1016 CELP coder and G.728 low-delay CELP ("LD-CELP"); ii) Algebraic CELP ("ACELP") coders including G.729, G.723, IS-641, enhanced variable rate codec ("EVRC"), GSM Enhanced full rate ("EFR"), Adaptive multi-rate ("AMR"), and AMR wideband ("AMR-WB"); iii) Vector sum CELP ("VSELP") coders including GSM half rate ("GSM-HR") and IS-54.

In general, a speech coding algorithm pursues speech compression rate, while preserving the original speech fidelity as much as possible. For example, assume the original speech has a sampling rate of 8 kHz and 16-bit per sample with the original speech having a bit rate 128 kbps. Different coding algorithms lead to different compression rates. Using a conjugate-structure ACELP ("CS-ACELP"), the 8 kbps G.729 achieves compression rate of 128/8=16. In some cases, an AMR coder may include eight modes, for example, 4.75 kbps, 5.15 kbps, 5.9 kbps, 6.7 kbps, 7.4 kbps, 7.95 kbps, 10.2 kbps, and 12.2 kbps. The achieved compression rates for the eight AMR modes are 26.95, 24.85, 21.69, 19.1, 17.3, 16.1, 12.55, and 10.49 respectively. As indicated by the AMR coder, a lower bit rate may achieve a higher compression rate, but at the price of dropped voice quality of the decoded speech.

There are many ways to evaluate the speech quality of a speech coder including both objective and subjective assessments, where the subjective assessment requires a group of listeners to rate the decoded speech they heard. For example, options may include excellent (5), good (4), fair (3), poor (2), and bad (1). The average of all scores is generally referred to as the mean opinion score (MOS).

Figure 3:
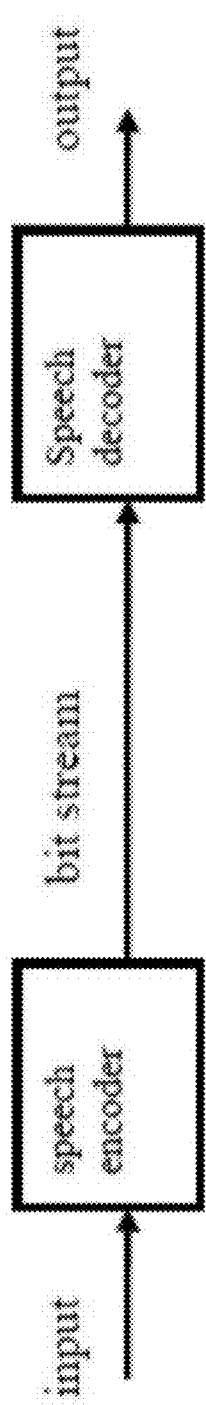
FIG. 3 is a diagrammatic view of a PESQ algorithm consistent with embodiments of the present disclosure.

Referring now to FIG. 3, an embodiment 300 depicting the transfer of data between a speech encoder and a speech decoder is provided. There are many tools and standards devoted to the objective voice quality measurement. The perceptual evaluation of speech quality ("PESQ") algorithm is the most widely accepted objective measurement method, an example of which is shown in FIG. 3. In this example, assume that the input file is clean speech as the reference and has a 16-bit PCM format with a 8 kHz sampling rate. After the speech encoding and decoding processing, an output file with a 16-bit PCM format is generated. Then, the PESQ algorithm may evaluate the voice quality of the output speech file using the input speech file as the reference, and may generate a PESQ MOS score. For example, the AMR mode 12.2 kbps may achieve a maximum PESQ MOS score close to 4.2 for a clean speech file.

Figure 4:
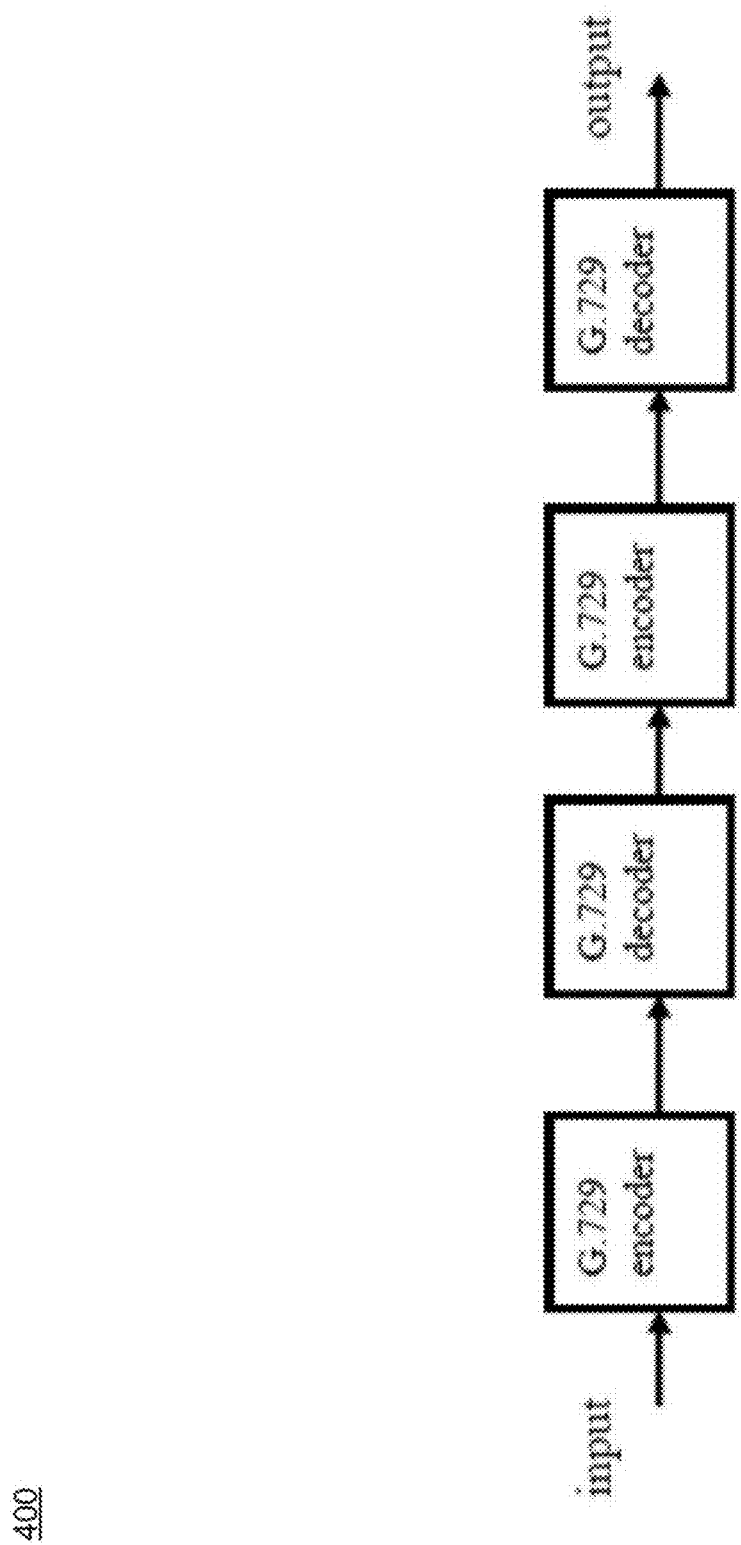
FIG. 4 is a diagrammatic view of G.729 self-tandeming consistent with embodiments of the present disclosure.

Referring now to FIG. 4, an embodiment 400 illustrating self-tandeming of a G.729 coder is provided. In this example, typical voice quality degradation in terms of a PESQ MOS score for a clean speech file due to G.729 self-tandeming is about 0.2 to 0.5 depending on the test speech files. It is noted that in FIG. 4, in some embodiments, the first decoder may not be physically located at the same place as the first encoder, while the last decoder may not be physically located at the same place as the second encoder.

Figure 5:
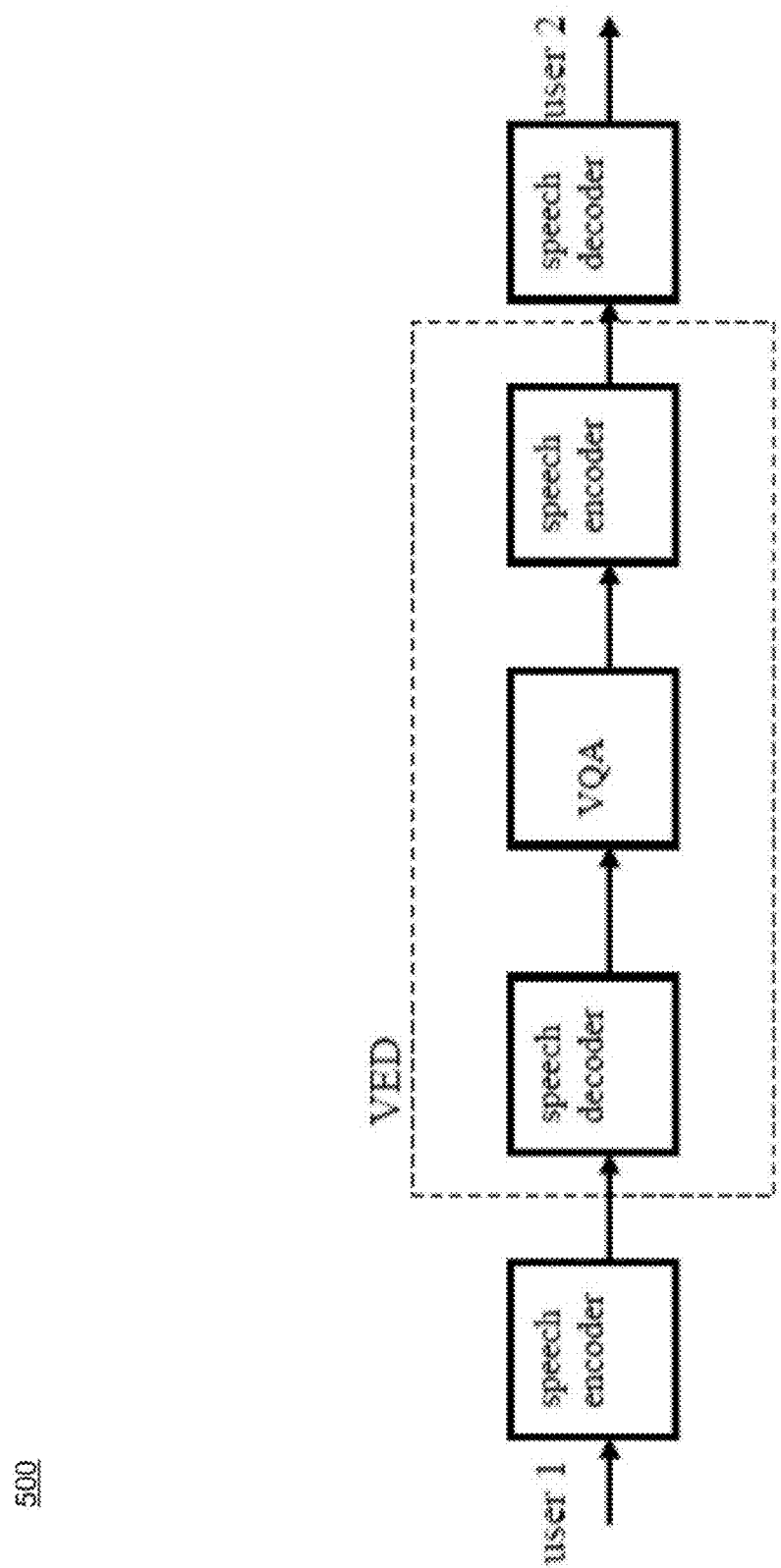
FIG. 5 is a diagrammatic view of a voice enhancement device consistent with embodiments of the present disclosure.

Referring now to FIG. 5, a diagram depicting a voice enhancement device ("VED") consistent with an embodiment 500 of tandeming reduction process 10 is provided. The voice enhancement algorithms are often referred to generally as voice quality assurance (VQA) techniques. In this diagram, the encoded bit stream from user 1 may be sent to a network device with VQA capability for voice enhancement. In some embodiments, the VQA algorithms may include adaptive noise reduction (ANR), acoustic echo cancellation (AEC), hybrid echo cancellation (HEC), adaptive level control (ALC), and enhanced voice intelligence (EVI) modules. The VQA algorithms may operate on the decoded speech. After the impairments such as noise and echo are removed, the speech may be encoded again. At this point, the encoded bit stream may be sent to user 2 for decoding. The reverse direction may operate similarly where the encoded speech from user 2 may be sent to VED for voice enhancement and the re-encoded speech may be sent to user 1 for decoding. In that particular example, both users may use a G.729 coder, the original speech may be encoded and decoded twice, resulting in voice quality degradation due to codec tandeming.

Embodiments of tandeming reduction process 10 may be used in accordance with a VoIP platform such as the Ethernet Voice Processor (EVP) described herein. Accordingly, tandeming reduction process 10 may provide the benefits of voice quality assurance (VQA) without the cost of tandeming. Tandeming may be reduced using a number of suitable techniques, some of which may include, but are not limited to, avoiding coding when it is not necessary, and, when it is necessary by modifying the excitation signal to the VED internal vocoder thereby minimizing the tandeming effect. When to trigger this re-computation of the excitation signal may be controlled by tests of the distance between the original excitation signal and the new excitation signal.

Embodiments of tandeming reduction process 10 may also be configured to handle excitation in both coding and not coding cases. The concept of not re-encoding in certain circumstances (e.g., such as clean speech) is one approach that may be used to avoid tandeming. Tandeming reduction process 10 may encode using one or more techniques as are discussed in further detail hereinbelow.

Embodiments of tandeming reduction process 10 may utilize one or more noise enhancement algorithms. In some embodiments, the noise enhancement algorithms may not change the linear prediction ("LP") filter coefficients, but may only change the excitation signal. LP filter coefficients may define the spectrum profile of speech signal. It may be beneficial to avoid altering this, since this is related to speaker's identity. The LP filter coefficients may be copied from the decoder input to the adaptive encoder output. The line spectral pair ("LSP") bit stream output representing the LP filter coefficients from the new system may be the same as that received by the decoder. This may help to avoid tandeming, since the LP filter coefficients are not encoded and decoded twice.

CELP-based coders may use an analysis-by-synthesis loop, where the optimum excitation sequence in a codebook may be selected by minimizing the error between the original and synthesized speech according to a perceptually weighted distortion measure. The optimized codebook gains and vectors for the input speech may be found by performing open-loop and closed-loop search.

Embodiments of tandeming reduction process 10 may use the same LP filter coefficients, and find the excitation signal, which, when put through the LP filter, provides the best match to the original input speech. Prior to performing this calculation, tandeming reduction process 10 may obtain the excitation signal from the previous frames for adaptive codebook generation. However, this may be difficult if the previous frame was not re-encoded. As such, tandeming reduction process 10 may locate the excitation signal when the previous frame was not re-encoded.

In some embodiments, the encoded parameters may be decoded at the decoder. These parameters may include, but are not limited to, the LSP vectors, the fractional pitch lags, the innovative code vectors, and the pitch and innovative gains. The LSP vectors may be converted to the LP filter coefficients and may be interpolated to obtain LP filters at each sub-frame. The excitation may be constructed by adding the adaptive and fixed code vectors scaled by their respective gains. Such excitation signals may need further enhancement to add voice intelligibility and increase voice coder stability. The speech signal may be synthesized by filtering the final version of the reconstructed excitation signal through the LP synthesis filter using the speech synthesis model. Such an optimized final version of the excitation signal may be saved in the adaptive encoder memory.

In some embodiments, during the encoding process, the speech synthesis model may be used to construct the excitation signal at the input of the short-term LP synthesis filter by adding two excitation vectors from the adaptive and fixed codebooks. In this way, the speech may be synthesized by feeding the two properly chosen vectors from these codebooks through the short-term synthesis filter. The optimum excitation sequence in a codebook may be chosen using an analysis-by-synthesis search procedure in which the error between the original and synthesized speech may be minimized according to a perceptually weighted distortion measure. The adaptive codebook may contain the predictable part of the excitation, that is, the component that may be obtained from the past. To finish the encoding process, the excitation signal from the previous frames for adaptive codebook generation may be used. When the previous frame was not re-encoded, the desired excitation signal may be generated.

In some embodiments, the CELP speech synthesis model may be used in both the speech encoder and speech decoder. The decoder may include an optimized final version of the excitation signal saved in the adaptive encoder memory. When the previous frame was not re-encoded, this optimized final version of the excitation signal may be employed in the encoder excitation historic buffer.

In some embodiments, the adaptive encoding algorithm may be configured to ensure that in the case of not coding, the two excitation signals have almost no difference. This may be a result of the distance between the optimized final version of the excitation signal and the new excitation signal being relatively small. Embodiments of tandeming reduction process 10 may directly employ this optimized final version of the excitation signal as the new excitation signal in the encoder historic excitation buffer. Regardless of coding and not coding, the encoder excitation signal may be synchronized by using this new method of adaptive excitation synchronization. As the decision of coding or not coding may change each frame, solving the excitation synchronization problem is addressed by the teachings of the present disclosure.

Referring now to FIGS. 6-9, a number of graphical examples demonstrating aspects of tandeming reduction process 10 are provided. These examples demonstrate how the adaptive encoding algorithm associated with tandeming reduction process 10 may avoid codec tandeming. In this way, the output from user 2 in FIG. 5 may have bit-exactness with the output in FIG. 3, or the output from user 2 may have a perfect PESQ score (e.g., 4.5 for narrowband) when the output in FIG. 3 is used as reference signal. In some embodiments, both user 1 and user 2 may use a G.729 coder.

Figure 6:
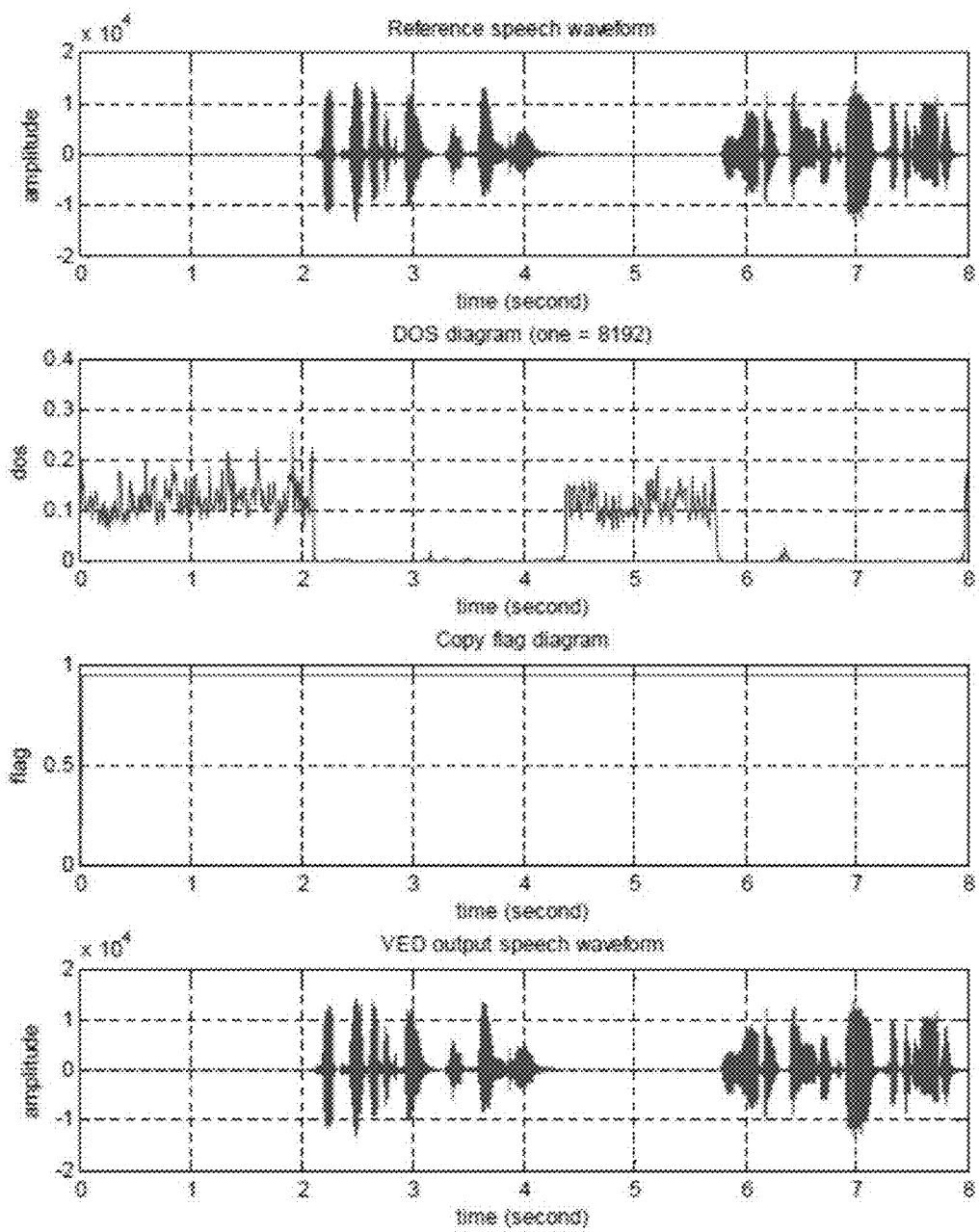
FIG. 6 is a diagrammatic view showing the avoidance of codec tandeming with voice quality assurance turned off consistent with embodiments of the present disclosure.

FIG. 6 shows an example when VQA is turned off. In some embodiments, tandeming reduction process 10 may be based on a distance-over-signal ("DOS") ratio where the distance may be calculated between the excitation vectors for the decoder output speech and the encoder input speech in VED. Since VQA is turned off, the DOS may be small as shown in the second diagram of FIG. 6, which leads to the copy flag nCtrlFlag=1. When nCtrlFlag=1, the decoder input is copied to the VED output for the current speech frame; when nCtrlFlag=0, the adaptive and fixed codebook gains and vectors are reencoded. Then, the VED output bit stream may be the same as the input bit stream to the decoder. User 2 may receive the same output as that in FIG. 3. Codec tandeming may be completely avoided in this particular case.

Figure 7:
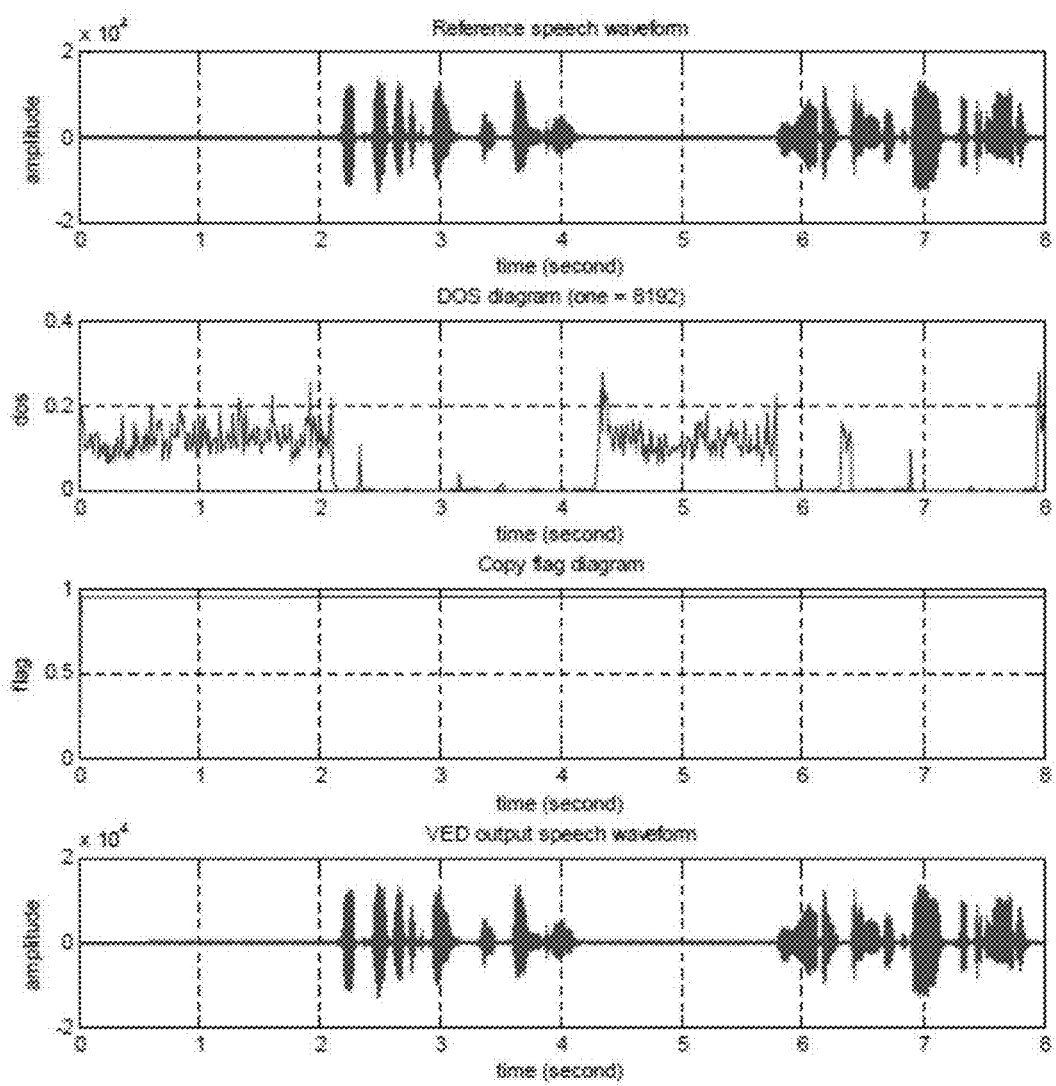
FIG. 7 is a diagrammatic view showing the avoidance of codec tandeming with voice quality assurance turned on for a clean speech file consistent with embodiments of the present disclosure.

FIG. 7 shows an example of a clean speech file when VQA is turned on. For a clean speech file, the VQA functions do not modify the original good quality speech, thus the DOS is small as shown in the second diagram of FIG. 7. Then, the copy flag nCtrlFlag=1. In this particular case, the VED output bit stream may be the same as the input bit stream to the decoder, and codec tandeming may be completely avoided again.

Figure 8:
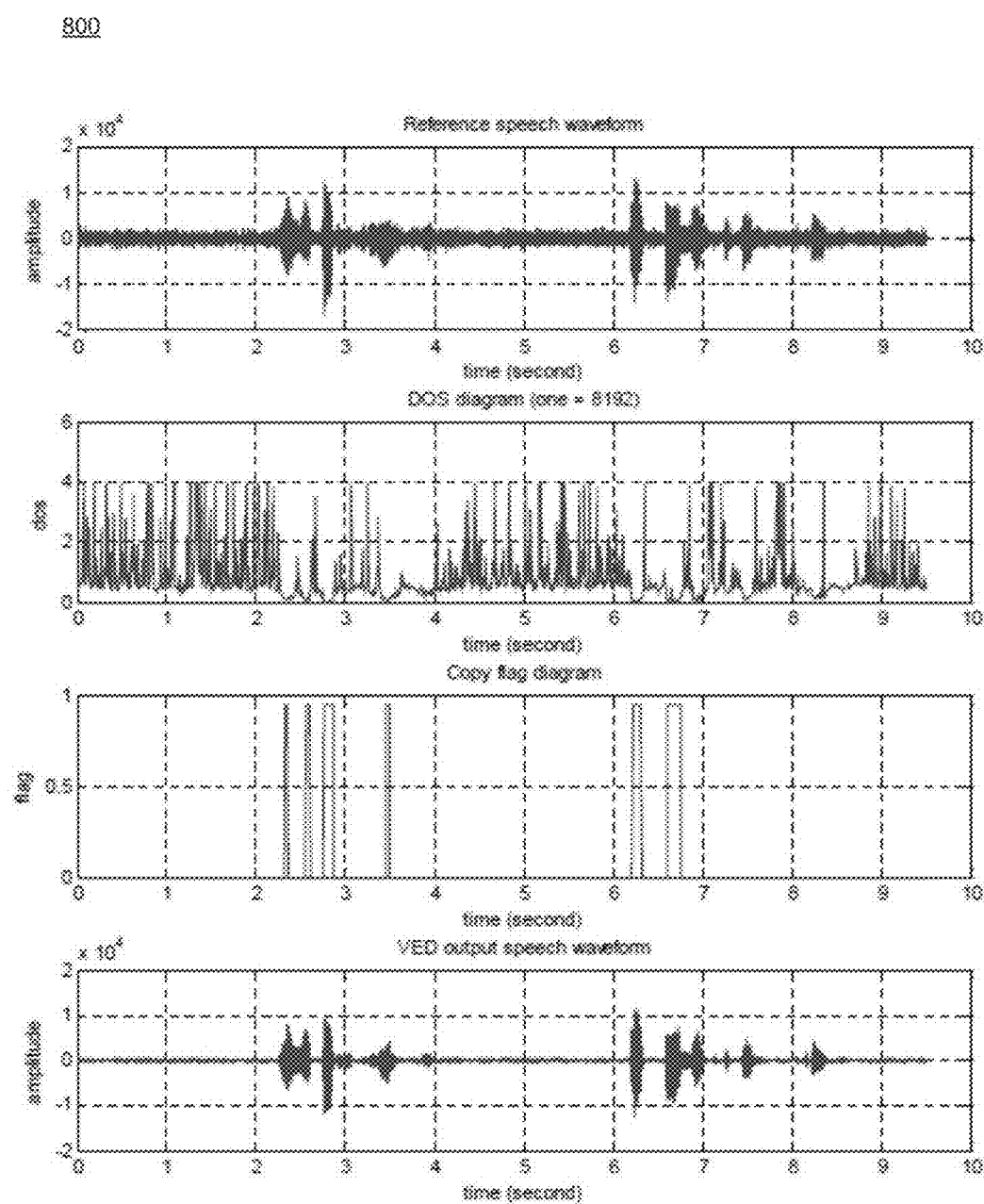
FIG. 8 is a diagrammatic view of a noisy speech file with VQA on and ANR enabled consistent with embodiments of the present disclosure.

FIG. 8 shows an example of a noisy speech file when VQA is turned on. For a noisy speech file, the VQA functions may be configured to remove the background noise so that the signal-to-noise ratio ("SNR") is improved and the voice quality is enhanced. The DOS may be large for the entire file as shown in the second diagram of FIG. 8. Then, the copy flag nCtrlFlag=0 primarily, which may indicate that the adaptive and fixed codebook gains and vectors are re-encoded. Even in this case, the LP coefficients are not modified and the LSP bit stream may be the same as the input in the decoder. As such, codec tandeming may be partially avoided in this case. However, for voice enhancement purposes, the background noise may be removed and re-encode the fixed and adaptive codebook gains and vectors.

Figure 9:
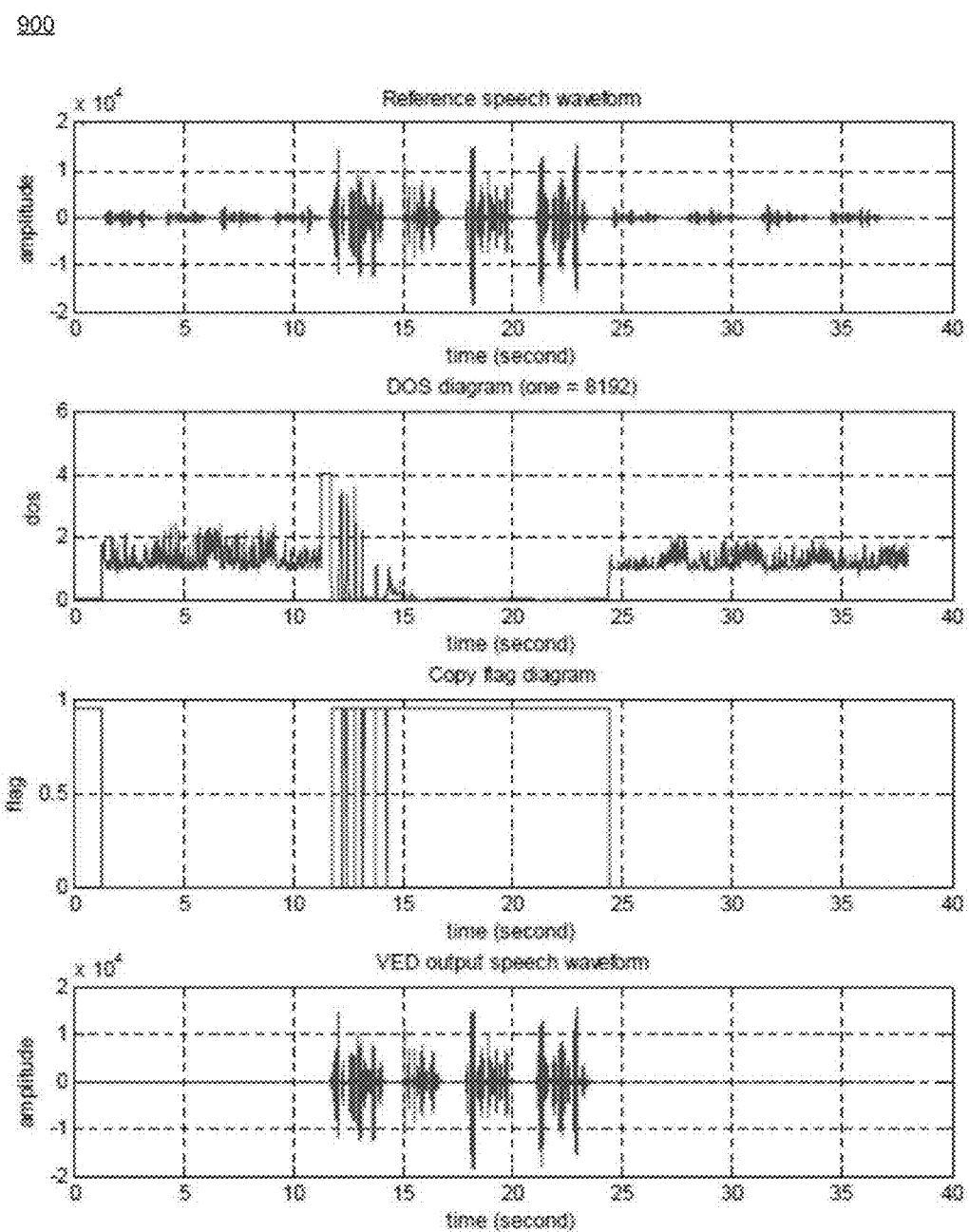
FIG. 9 is a diagrammatic view of a speech file with echo with VQA on and AEC enabled consistent with embodiments of the present disclosure.

FIG. 9 shows an example of a speech file with echo when VQA is turned on. For an echo file, the AEC module in VQA may be configured to remove the annoying echo so the voice quality is enhanced. The DOS may be very large for the speech frames with echo, but very small for the speech frames without echo. The copy flag nCtrlFlag=1 for most of the speech frames, but nCtrlFlag=0 for most of the echo frames. After the echo is removed, the original frames may be replaced by comfort noise, which is not audible. Even if the new inaudible comfort noise frames are re-encoded, it may not affect the voice quality. As a result, codec tandeming is avoided in this example as well.

As shown above, embodiments of the present disclosure may avoid codec tandeming when VQA is turned off. Codec tandeming is also avoided for clean speech files, noisy files (partially to remove background noise), and echo files.

Embodiments of the present disclosure may include an adaptive encoding algorithm for CELP-based speech coders to deal with codec tandeming. Embodiments discussed herein provide examples of three CELP based coders, namely, G.729, GSM-HR, and AMR, however the present disclosure is not intended to be limited to these examples. One such example, discussed below, is directed towards G.729 and Appendix C, which contains the floating-point implementation of G.729 coders. The discontinuous transmission (DTX) discussion is based on G.729 Appendix B and includes a floating-point implementation. For simplicity, this may be referred to as the resulting ANSI C code G.729CB coder.

In one particular example discussed herein, the mathematical formulas are described using a G.729CB coder. As such, unless specified (e.g. as GSM-HR and/or AMR), the underlying descriptions hereafter are intended for a G.729CB coder.

With the descriptions for three CELP based speech coders provided herein, those skilled in the art may apply the teachings of the present disclosure to any other CELP-based speech coder. Some of these may include, but are not limited to, i) FS-1016 CELP coder and G.728 low-delay CELP (called LD-CELP); ii) algebraic CELP (ACELP) coders including G.729, G.723, IS-641, enhanced variable rate codec (EVRC), GSM enhanced full rate (EFR), adaptive multi-rate (AMR), and AMR wideband (AMR-WB); iii) vector sum CELP (called VSELP) coders including GSM Half Rate (GSM-HR) and IS-54, etc.

In some embodiments, a typical CELP model may include a cascaded connection of a pitch synthesis filter and a formant synthesis filter. The pitch, or long-term, synthesis filter may be given by:

$$H_p(z) = \frac{1}{1+g_p z^{-T}}, \qquad (1)$$

where T is the pitch delay and $g_p$ is the pitch gain. The pitch synthesis filter is normally implemented using an adaptive codebook approach. The formant, or short-term, synthesis filter may be a 10-order infinite impulse response (IIR) filter which may have the following form:

$$H_f(z) = \frac{1}{A(z)}, A(z) = 1 + \sum_{i=1}^{M} a_i z^{-i}, M = 10 \qquad (2)$$

For G.729CB and AMR coders, the short-term synthesis filter may use the quantized linear prediction coefficients (LPCs) with the following form:

$$H_f(z) = \frac{1}{\hat{A}(z)}, \hat{A}(z) = 1 + \sum_{i=1}^{M} \hat{a}_i z^{-i}, M = 10 \qquad (3)$$

where $\hat{a}_i$, $1 \leq i \leq 10$ are the quantized LPCs. Higher order M values may be used for wideband coders.

Figure 10:
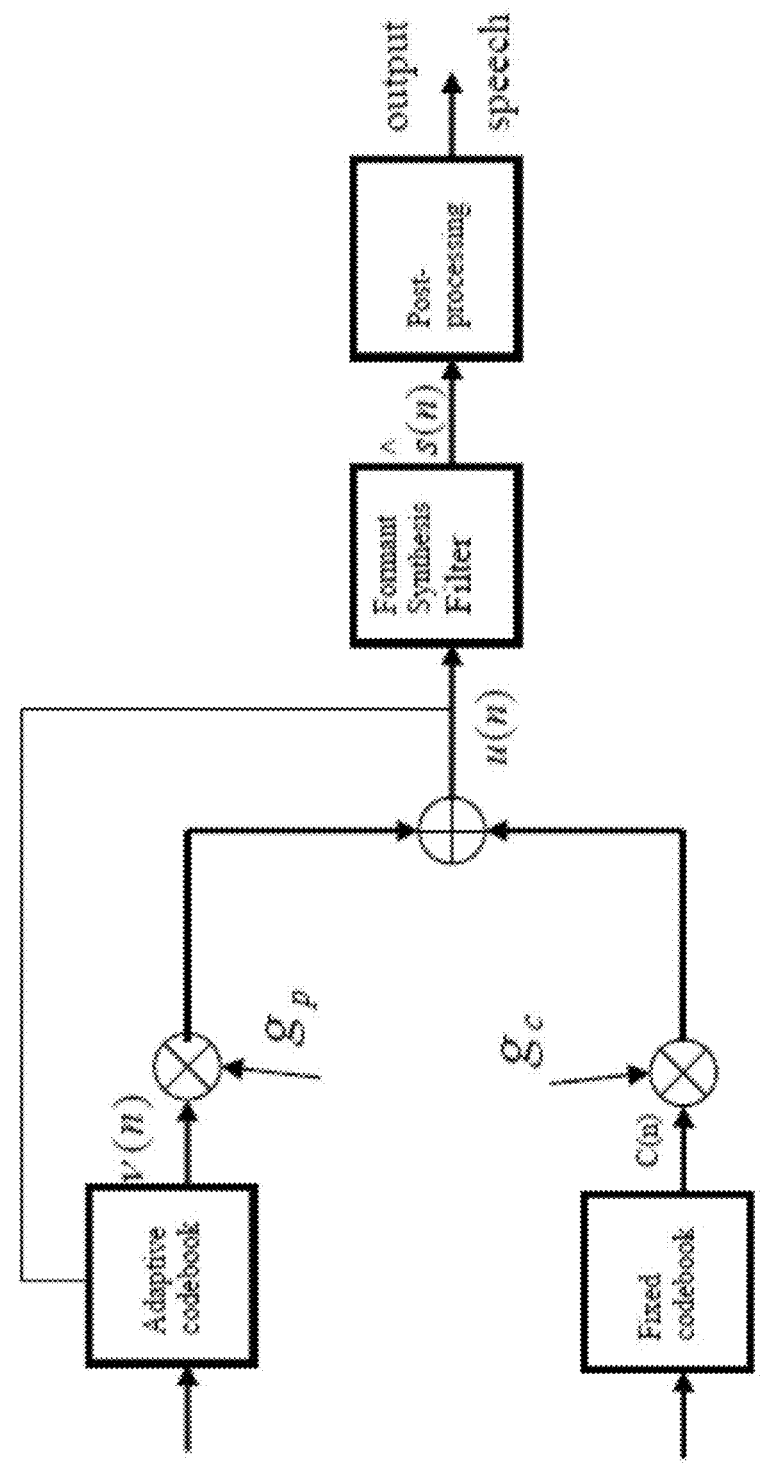
FIG. 10 is a diagrammatic view of a CELP speech synthesis model consistent with embodiments of the present disclosure.

Referring now to FIG. 10, an embodiment depicting a CELP speech synthesis model is provided. In this particular example, the total excitation before the formant synthesis filter may be given by:

$$u(n) = g_p v(n) + g_c c(n) \qquad (4)$$

where u(n) may be the total excitation, v(n) and c(n) are the excitation vectors from adaptive codebook and fixed codebook, $g_p$ and $g_c$ are the adaptive codebook gain and the fixed codebook gain respectively. The formant synthesis filter output may be denoted by $\hat{s}(n)$.

In some embodiments, the CELP-based coders described herein may use an analysis-by-synthesis loop, where the speech encoder uses the speech synthesis model as in FIG. 10 to construct the excitation signal at the input of the short-term linear prediction (LP) synthesis filter by adding two excitation vectors from adaptive and fixed codebooks.

The speech may be synthesized by feeding the two properly chosen vectors from these codebooks through the short-term synthesis filter. The optimum excitation sequence in a codebook may be chosen using an analysis-by-synthesis search procedure in which the error between the original and synthesized speech may be minimized according to a perceptually weighted distortion measure.

For each codec frame, the speech signal may be analyzed to extract the parameters of the CELP model including line spectral pair (LSP) parameters of the LP filter coefficients, indices and gains of the adaptive and innovative codebooks. These parameters may be encoded and transmitted.

At the decoder, the encoded parameters may be decoded. These parameters may include, but are not limited to, the LSP vectors, the fractional pitch lags, the innovative code vectors, and the pitch and innovative gains. The LSP vectors may be converted to the LP filter coefficients and may be interpolated to obtain LP filters at each sub-frame. The excitation may be constructed by adding the adaptive and fixed code vectors scaled by their respective gains. The speech signal $\hat{s}(n)$ may be synthesized by filtering the reconstructed excitation signal $u(n)$ through the LP synthesis filter using the speech synthesis model as shown in FIG. 10. The post-processing module may further process $\hat{s}(n)$ and generate the output speech $sp(n)$ in the speech decoder. It should be mentioned that the CELP speech synthesis model in FIG. 10 may be used in both the speech encoder and speech decoder for different purposes.

Figure 11:
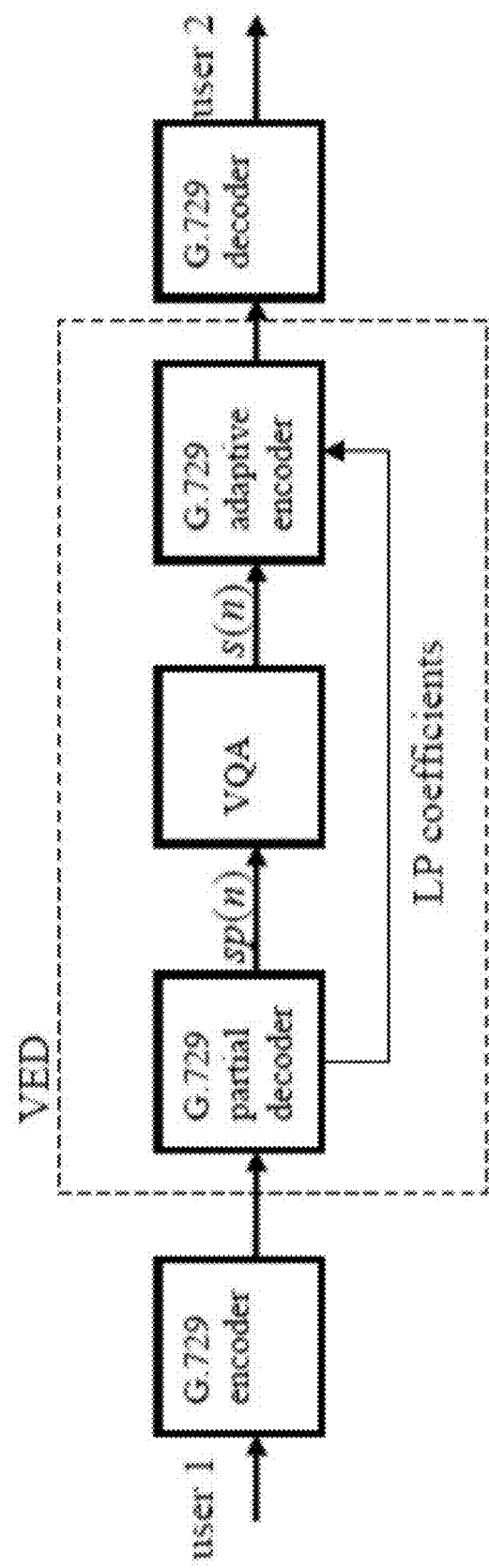
FIG. 11 is a diagrammatic view depicting G.729 codec tandeming consistent with embodiments of the present disclosure.

Referring now to FIGS. 5 and 11, since there are two identical speech decoder modules for the self-tandeming in the data path, some functions of the speech decoder in the VED are not necessary to use. Accordingly, the speech decoder in the VED may be referred to as a partial decoder. The speech encoder in the VED may be referred to herein as an adaptive encoder. When both users use a G.729 coder, FIG. 11 depicts the new VED system, which is discussed in further detail below. Similar diagrams may be obtained when both users are using GSM-HR and AMR coders.

In FIG. 11, the LP filter coefficients may be copied from the decoder input to the adaptive encoder output, to avoid codec tandeming. The LSP bit stream output from the adaptive encoder may be the same as that received by the partial decoder. This may differ from the traditional VED system as in FIG. 5, where the LPCs are encoded and decoded twice.

As shown in FIG. 10, the speech signal output $sp(n)$ from the partial decoder may be synthesized by the formant synthesis filter given by Equation 3 above. The excitation signal used to generate the speech signal $sp(n)$ may be denoted by $e2(n)$. The speech signal $sp(n)$ may be processed by the voice enhancement algorithms in the VQA module. Here, the output signal may be denoted by $s(n)$. The total excitation signal $e2(n)$, which may be used to synthesize the speech signal $sp(n)$, may have changed to a new excitation signal $e1(n)$, corresponding to the new speech signal $s(n)$. The new excitation $e1(n)$ may be calculated by the analyzer filter $\hat{A}(z)$ as follows:

$$e1(n) = s(n) + \sum_{i=1}^{M} \hat{a}_i s(n-i) \tag{5}$$

where $\hat{a}_i$, $1 \leq i \leq M$ in Equation 5 are the interpolated $\hat{A}(z)$ coefficients for each sub-frame. The distance or distortion between the two excitation vectors $e1(n)$ and $e2(n)$ may be defined by:

$$D = \sum_{n=0}^{N-1} |e1(n) - e2(n)|^2 \tag{6}$$

where N is the frame length. Other $L_2$ or $L_p$ methods can be used to define the distance, where $p \geq 1$ is an integer.

Since $e2(n)$ is the original excitation signal, a distance-over-signal (DOS) ratio may be defined as follows:

$$R = \frac{D}{\sum_{n=0}^{N-1} e2(n)^2} \tag{7}$$

The dB value of R, $10 \log_{10}(R)$, may be useful for further reference. Based on the distance-over-signal ratio R defined in Equation 7, the adaptive encoding algorithm may decide whether the original input bit stream to the partial decoder is copied to the output of the encoder, or to re-encode the adaptive and fixed codebook gains and vectors due to voice enhancement algorithms in the VQA module for the current frame.

For fixed-point operation, suppose that one means $2^{13}=8192$. A local decision flag may be defined as follows:

$$\text{flag} = \begin{cases} 1, & \text{if } R < 1000 \\ 0, & \text{otherwise} \end{cases} \tag{8}$$

A more restrictive condition may be used if echo is detected and removed by the VQA module. In this case, the local decision flag may be defined by:

$$\text{flag} = \begin{cases} 1, & \text{if } R < 250 \\ 0, & \text{otherwise} \end{cases} \tag{9}$$

In some embodiments, the threshold values in Equations 8 and 9 may be selected in a range from 1 to 8192. The equivalent logarithmic scale may also be used. The local bypass flag in Equations 8 and 9 may be further refined by a decision control module. The local flag may be saved in a buffer for each frame. Among the latest three frames, if the local flag is defined as one for at least two frames, then the final decision flag nCtrlFlag may be defined as one, otherwise, it may be defined as zero.

In some embodiments, the power measurement may be used for the decision enhancement. In the event that the echo is not detected and not removed, if the measured power level is below a threshold, then the decision flag nCtrlFlag may be set to one. The threshold may be selected from (−65) dB until (−96) dB as a reference.

In one particular example, suppose that nCtrlFlag=1 at the end. Here, the input bit stream to the G.729CB partial decoder may be copied to the output of the adaptive encoder to avoid codec tandeming. In this case, the input bit stream may be intact and the output bit stream may be identical to the input bit stream for this frame so that the codec tandeming is avoided for this speech frame.

In another example, suppose that nCtrlFlag=0 at the end. The LPC parameters may be copied from the decoder input to the adaptive encoder output. The adaptive and fixed codebook search, the gain optimization and quantization may be performed as with the original speech coder. The adaptive and fixed codebook indexes and gains may be re-encoded. Accordingly, codec tandeming may be partially avoided in this case.

As discussed above, CELP-based coders often use an analysis-by-synthesis loop, where the optimum excitation sequence in a codebook is chosen by minimizing the error between the original and synthesized speech according to a perceptually weighted distortion measure. The optimized codebook gains and vectors for the input speech s(n) may be found by performing the open-loop and closed-loop search.

In some embodiments, the speech encoder state variables may include a buffer for the encoder excitation vectors. For example, let pEncState be a pointer to the defined encoder state memory and pEncState->old_exc[ ] be the excitation buffer. The excitation buffer may contain the excitation vectors for the current frame, as well as enough historic excitation vectors necessary to drive the adaptive codebook generation. For example, it may be necessary to have (PIT_MAX+L_INTERPOL) historic excitation samples in this buffer for G.729CB and AMR coders, where PIT_MAX=143 and L_INTERPOL=11.

As shown in FIG. 10, there may be a loop between the adaptive codebook and the excitation signal u(n), which may indicate that the adaptive codebook vector may be generated from the history of current excitation signal u(n). The adaptive codebook may contain the predictable part of the excitation, that is, the component that can be obtained from the past. When nCtrlFlag=1, the encoding process including the open loop pitch search, the closed loop codec book search, the gain optimization, and the gain quantization may be bypassed. The excitation signal u(n) may not be available for this frame. If nCtrlFlag=1 is followed by nCtrlFlag=0 in the next frame, it may be beneficial to locate the historic excitation vectors to drive the adaptive codebook generation for the next frame. As the decision of coding or not coding may change each frame, solving the excitation synchronization problem may be addressed by the teachings of the present disclosure.

The importance of the excitation synchronization may also be observed from the coder stability. For the stability of the pitch synthesis filter given in Equation 1, it is required that the pitch gain $|g_p|<1$, but for coder intelligibility, $|g_p|$ upper bound is normally chosen between 1.2 to 2. For example, for G.729CB and AMR coders, the upper bound may be selected as 1.2. The computation of adaptive codebook gain may require the past excitation vectors. As such, excitation synchronization may be necessary for the coder stability.

For a speech frame with nCtrlFlag=0, the adaptive and fixed codebook search, the gain optimization and quantization may be performed as the G.729CB coder. Based on the analysis-by-synthesis CELP model, the total encoder excitation based on Equation 4 or a quantized version may be calculated and saved in the encoder excitation memory for current frame. Subsequently, the historic excitation samples may be prepared based on the latest excitation samples in the encoder excitation buffer pEncState->old_exc[ ] for the adaptive codebook generation in the next frame.

For a speech frame with nCtrlFlag=1, the encoding process including the open loop pitch search, the closed loop codec book search, the gain optimization, and the gain quantization may be bypassed. Accordingly, the process to calculate the total encoder excitation based on Equation 4 may not be available for this frame. An adaptive excitation synchronization approach is discussed in further detail hereinbelow, which addresses this issue. If nCtrlFlag=1, the excitation vector e2(n) calculated for the adaptive encoder may be used for the excitation synchronization, where the excitation buffer for e2(n) is copied to the encoder excitation memory pEncState->old_exc[ ] for this speech frame. Accordingly, in both cases nCtrlFlag=0 and 1, the encoder excitation memory in pEncState->old_exc[ ] may be synchronized.

As discussed above, embodiments of tandeming reduction process 10 may include one or more partial decoders. For example, and in the discussion below, let pAdaptive refer to a pointer to the defined adaptive encoder memory and pDecState refer to a pointer to the defined decoder state memory.

In some embodiments, the decoded LP parameters including the interpolated $\hat{A}(z)$ coefficients per sub-frame and line spectral pair (LSP) parameters per codec frame may be saved in the adaptive encoder memory pointed by pAdaptive. The original encoded LPC bits may also be saved in the adaptive encoder memory pointed by pAdaptive for each codec frame. The other saved variables in the adaptive encoder memory may include, but are not limited to, the bad frame indicator (BFI), voicing factor from previous codec frame, frame type of the current codec frame, etc.

In some embodiments, the decoded integer and fractional pitch delay may also be saved in the adaptive encoder memory. The decoded pitch gain may also be saved in the adaptive encoder memory. The fixed codebook gain and vector may be saved in the adaptive encoder memory.

In some embodiments, the total excitation prior to the synthesis filter in the decoder may be given by:

$$u(n)=\hat{g}_p v(n)+\hat{g}_c c(n) \qquad (10)$$

where u(n) is the total excitation, v(n) and c(n) are the excitation vectors from adaptive codebook and fixed codebook, $\hat{g}_p$ and $\hat{g}_c$ are the quantized adaptive codebook gain and the quantized fixed codebook gain respectively.

In some embodiments, if the bad frame indicator (BFI) is not zero, then embodiments of the present disclosure may use the voicing factor to decide how to calculate the total excitation. For a voiced frame, the total excitation u(n) may be given by the adaptive codebook contribution:

$$u(n)=\hat{g}_p v(n). \qquad (11)$$

For an unvoiced frame, the total excitation u(n) is given by the fixed codebook contribution:

$$u(n)=\hat{g}_c c(n). \qquad (12)$$

The above procedure may be performed on a sub-frame basis for every sub-frame. At the end of the decoder function, the total excitation vectors u(n), $1 \le n \le 80$ per codec frame may be saved in the adaptive encoder memory pAdaptive->dec_curr_exc[ ].

In some embodiments, in the example of a GSM-HR coder, the total excitation obtained from Equation 10 may be further enhanced by the pitch pre-filter. The enhanced version of the total excitation may be saved in the adaptive encoder memory pAdaptive->dec_curr_exc[ ].

In some embodiments, in the case of an AMR coder, the total excitation obtained from Equation 10 may be enhanced by the phase dispersion. Subsequently, an excitation control module may be applied to emphasize the excitation depending on the pitch gain value. When $\hat{g}_p > 0.5$, the excitation may be emphasized by the adaptive codebook contribution, and then may be further processed by the adaptive gain control (AGC). Additional instability protection may be needed for the excitation signal, where if overflow of the synthesis filter output occurs, the excitation buffer may be scaled down by a factor (e.g., four) and the synthesized speech may be re-calculated. This may be performed per sub-frame. The total enhanced excitation before the speech synthesis filter may be saved in the adaptive encoder memory pAdaptive->dec_curr_exc[ ].

In some embodiments, tandeming reduction process 10 may be configured to estimate the power of the synthesized speech. For example, the average power may be calculated as follows for the current speech frame sp(n), 1≤n≤80:

$$P = \frac{1}{N} \sum_{n=0}^{N-1} sp^2(n), N = 80 \quad (11)$$

The dB value $10 \log_{10} P$ of the averaged power may be saved in the adaptive encoder memory.

In some embodiments, and as shown in FIG. 10, a post-processing module may be running in the remote G.729 decoder. Accordingly, the post-processing module including the high-pass filtering in the partial decoder may be disabled, to avoid codec tandeming.

As discussed above, embodiments of tandeming reduction process 10 may include one or more adaptive encoders. For example, and in the discussion below, let pAdaptive refer to a pointer to the defined adaptive encoder memory and pEncState refer to a pointer to the defined encoder state memory.

In some embodiments, during a speech encoder initialization, the present speech frame may be changed to the new speech frame. This efficiently removes the delay (e.g. 5 ms) introduced in the original coders, to avoid codec tandeming. Therefore, the adaptive encoder of the present disclosure may not include the 5 ms delay from the original coders.

In some embodiments, the pre-processing module, which may include the high-pass filter may be disabled, to avoid codec tandeming. This may be enabled by the pre-processing module used in the remote encoder of user 1 as shown in FIG. 11.

In some embodiments, the decoded LP parameters, which may include the interpolated $\hat{A}(z)$ coefficients per sub-frame and line spectral pair (LSP) parameters per codec frame may be copied from the adaptive encoder memory. The local LP analysis may not be needed. The quantized LPC bits from the adaptive encoder output may be the same as the input LPC bits received in the partial decoder.

Embodiments of tandeming reduction process 10 may include an excitation calculation for an adaptive encoder. The excitation signal e2(n) may be obtained from the adaptive encoder memory pAdaptive->dec_curr_exc[ ]. The excitation signal e2(n) calculation may include all possible variants between the total excitation u(n) as shown in FIG. 10 and the final excitation signal before the formant synthesis filter, whenever applicable for other CELP based coders.

In some embodiments, the excitation signal e2(n) calculation may include an approach to generate the total excitation u(n) as shown in FIG. 10, which may utilize at least a bit of the adaptive and fixed codebook vectors, and at least a bit of the adaptive and fixed codebook gains, from the decoder, encoder, and/or from any combination therebetween.

In some embodiments, the total excitation u(n) before the pitch pre-filter can be a candidate of e2(n) for GSM-HR coder. Additionally and/or alternatively, the total excitation u(n) before the phase dispersion function may be a candidate of e2(n) for AMR coder. In some embodiments, the enhanced version of u(n) after phase dispersion may be a candidate of e2(n). In yet another embodiment, the emphasized excitation vector by the adaptive codebook contribution can be a candidate of e2(n) for AMR coder.

Embodiments of tandeming reduction process 10 may include an adaptive encoding algorithm. The AMR coder may include a number of different mode rates (e.g. eight), plus SID frames and no data frames. With the mode rate as the index, two threshold arrays may be defined:

int AMR_THR1[16]={819, 819, 819, 819, 409, 409, 409, 409, 409, 0, 0, 0, 0, 0, 0, 409};
int AMR_THR2[16]={1638, 1638, 1638, 1638, 819, 819, 819, 819, 819, 0, 0, 0, 0, 0, 0, 819};

These may be used in Equations 8 and 9 respectively for an AMR coder, where mode 0 to 7 means 4.75 kbps to 12.2 kbps respectively. The threshold values may be selected in a range from 1 to 8192.

In some embodiments, tandeming reduction process 10 may include a memory updating scheme without a codebook search. For example, when nCtrlFlag=0, the states of the synthesis and the weighting filters may be updated based on the original encoder, using an equivalent implementation for computing the target signal for G.729CB and AMR coders. When nCtrlFlag=1, an update of the states of the synthesis and weighting filters may still be required, even though the actual codebook search, gain optimization and quantization process may be bypassed. In this particular example, the new updated total excitation vector buffer of the encoder of the current frame may be used.

In some embodiments, the synthesis filter state memory may be updated by passing the total excitation of the current frame through the synthesizer filter $H_f(z)$ defined in Equation 3. The output of this filter may be denoted by $\hat{s}(n)$. The filter states pEncState->mem_syn[ ] may contain the latest 10 samples of $\hat{s}(n)$.

After obtaining $\hat{s}(n)$, the error signal may be calculated:

$$err(n) = s(n) - \hat{s}(n) \quad (13)$$

The states of the synthesis filter $1/\hat{A}(z)$ in the equivalent implementation of the G.729CB and AMR encoders may be given by err(n), 30≤n≤39. The ten samples for the error signal err(n) may be saved in the memory pEncState->mem_err[ ].

For a GSM-HR coder, when nCtrlFlag=0, the states of the weighting filters C(z) and H(z) may be updated based on the original encoder, where C(z) is the harmonic noise weighting filter and H(z) is the spectral noise weighting filter. When nCtrlFlag=1, the actual codebook search, gain optimization and gain quantization process may be bypassed. The states of the weighting filters C(z) and H(z) may be updated using the following procedure.

Since C(z) is a finite impulse response (FIR) filter, the latest HNW_BUFF_LEN−S_LEN (=145−40) samples in the C(z) state memory may be shifted to the beginning of the state memory buffer. Then, the system may pass the total excitation vectors u(n) saved previously to the H(z) filter. The output of the H(z) filter goes to C(z) state. In this way, both C(z) and H(z) state memories may be updated.

Embodiments of tandeming reduction process 10 may include a method on how to adaptively encode T-milliseconds codec frames of an input signal sampled at a rate of S kilobits per second for an adaptive encoder without voice quality degradation due to codec tandeming. Embodiments may include speech decoding and encoding in a network device comprising adaptive excitation synchronization for CELP based speech coders to solve voice quality degradation due to codec tandeming. Embodiments may include the excitation calculation for the speech signal after voice enhancement processing and the excitation calculation for the adaptive encoder for each codec frame. Embodiments also include determining how to calculate a distance-over-signal ratio R where R is defined as the ratio between the $L_2$ distance D of two excitation vectors and the signal energy of the targeted excitation vector.

Embodiments disclosed herein may also include an adaptive encoding algorithm configured to calculate the final decision flag nCtrlFlag. Based on nCtrlFlag, a decision may be made as to whether the original input bit stream with clean speech to the partial decoder is copied to the output of the adaptive encoder, or the adaptive and fixed codebook gains and vectors for the speech frames with impairments such as noise and echo are re-encoded for voice enhancement purposes in a VQA module.

Accordingly, embodiments of tandeming reduction process 10 may address the issue of codec tandeming for clean speech, and simultaneously achieve voice enhancement for speech frames with impairments such as noise and echo. For clean speech, the decision flag nCtrlFlag=1, in which case the actual encoding process including codebook search, gain optimization and quantization may be bypassed. This may result in less CPU MIPS usage, which in turn may increase the system capacity in terms of number of voice channels. The teachings of the present disclosure may be applied to any CELP based speech coders.

Figure 12:
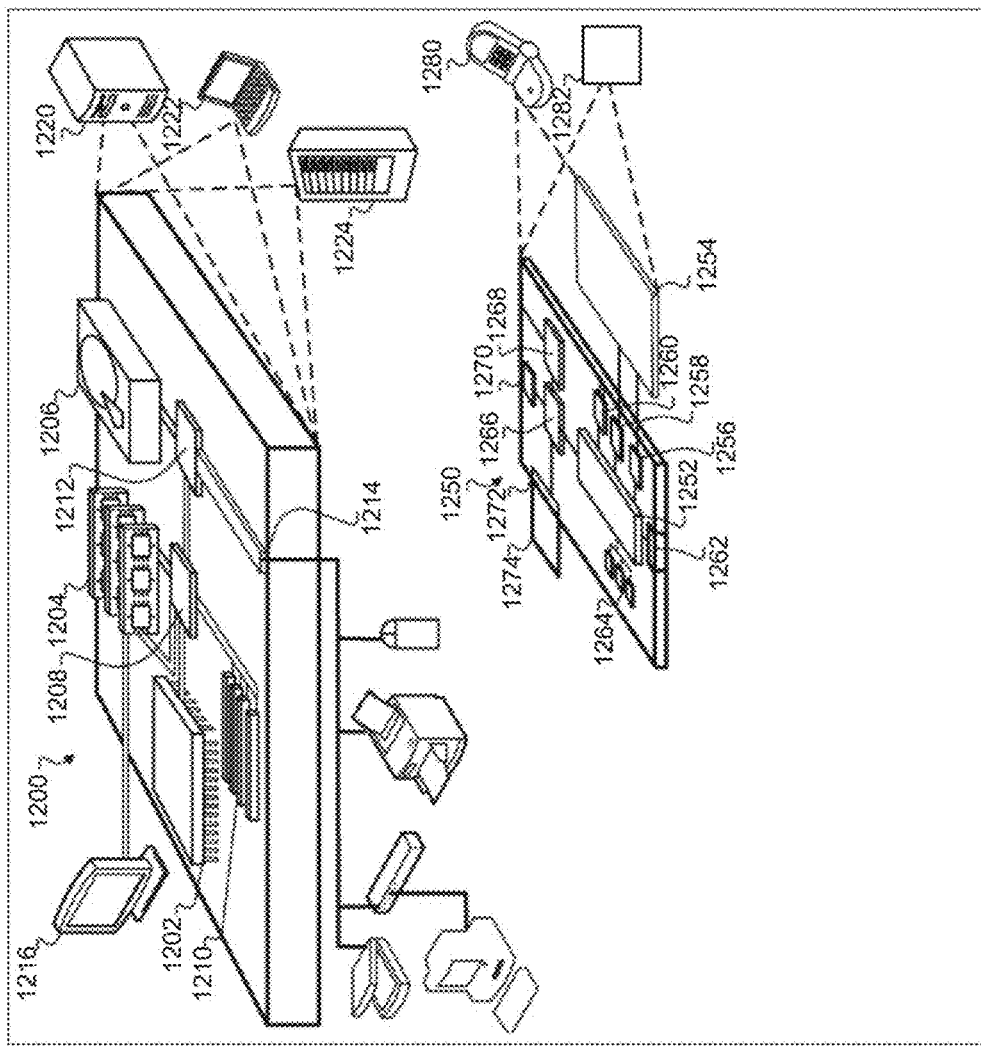
FIG. 12 shows an example of a computer device and a mobile computer device that can be used to implement embodiments of the present disclosure.

Referring now to FIG. 12, an example of a generic computer device 1200 and a generic mobile computer device 1250, which may be used with the techniques described here is provided. Computing device 1200 is intended to represent various forms of digital computers, such as tablet computers, laptops, desktops, workstations, personal digital assistants, servers, blade servers, mainframes, and other appropriate computers. In some embodiments, computing device 1250 can include various forms of mobile devices, such as personal digital assistants, cellular telephones, smartphones, and other similar computing devices. Computing device 1250 and/or computing device 800 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 1200 may include processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, may be interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208.

In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

Memory 1204 may store information within the computing device 1200. In one implementation, the memory 1204 may be a volatile memory unit or units. In another implementation, the memory 1204 may be a non-volatile memory unit or units. The memory 1204 may also be another form of computer-readable medium, such as a magnetic or optical disk.

Storage device 1206 may be capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, memory on processor 1202, or a propagated signal.

High speed controller 1208 may manage bandwidth-intensive operations for the computing device 1200, while the low speed controller 1212 may manage lower bandwidth-intensive operations. Such allocation of functions is exemplary only. In one implementation, the high-speed controller 1208 may be coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 may include a processor 1252, memory 1264, an input/output device such as a display 1254, a communication interface 1266, and a transceiver 1268, among other components. The device 1250 may also be provided with a storage device, such as a micro-drive or other device, to provide additional storage. Each of the components 1250, 1252, 1254, 1264, 1266, and 1268, may be interconnected using various buses, and several of the components may be mounted on a common motherboard or in other manners as appropriate.

Processor 1252 may execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

In some embodiments, processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provided in communication with processor 1252, so as to enable near area communication of device 1250 with other devices. External interface 1262 may provide, for example, for wired communication in some implementations, or for wireless communication in other implementations, and multiple interfaces may also be used.

In some embodiments, memory 1264 may store information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 1264, expansion memory 1274, memory on processor 1252, or a propagated signal that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

Computing device 1250 may be implemented in a number of different forms, as shown in the figure. For example, it may be implemented as a cellular telephone 1280. It may also be implemented as part of a smartphone 1282, personal digital assistant, remote control, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, $C^{++}$ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider). Any examples of code provided in the present disclosure are provided merely by way of example and are only provided as one possible way in, which the teachings of the present disclosure may be implemented.

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method for reducing tandeming effects in a communications system comprising:
    receiving an incoming initial audible audio speech signal from a user at a speech encoder;
    receiving, at a speech decoder, an input bitstream associated with the incoming initial audible audio speech signal from the speech encoder;
    determining, at the speech decoder, a decoded signal based on the received input bitstream;
    determining whether or not coding is required, wherein determining whether or not coding is required comprises comparing an excitation signal constructed using the decoded signal to a previous optimized final version of the excitation signal from a previous frame;
    upon determining that coding is required,
        modifying the excitation signal associated with the input bitstream;
        providing the modified excitation signal to an adaptive encoder;
        calculating a new excitation signal e1($n$) for a new speech signal s(n) after Voice Quality Assurance ("VQA") processing has been performed, wherein VQA processing is performed on the decoded signal prior to providing the signal to the adaptive encoder;
        calculating a total excitation signal e2($n$) for the decoded signal sp(n) before VQA; and
        deciding whether the decoded signal from the speech decoder is copied to an output of the adaptive encoder using an adaptive coding algorithm, by calculating a distance over signal ("DOS") ratio "R" between the new excitation signal e1($n$) and the total excitation signal e2($n$); and
        encoding the modified excitation signal at the adaptive encoder, and transmitting the encoded modified excitation signal with the decoded signal based on deciding that the decoded signal is to be copied.

2. The method of claim 1, further comprising:
    decoding T-milliseconds codec frames of the input bitstream that was encoded by a code excited linear prediction ("CELP") based encoder at a rate of S kilobits/second for an adaptive encoder.

3. The method of claim 1, further comprising:
    calculating a total excitation signal u(n) by adding an adaptive and a fixed codebook vector, each scaled by a respective gain.

4. The method of claim 3, further comprising:
    saving the total excitation signal u(n) at an adaptive encoder memory, wherein at least one of the adaptive codebook vector and the fixed codebook vector include speech frames and discontinuous transmission ("DTX") frames based on a CELP-based standard.

5. The method of claim 2, wherein the adaptive encoder includes an adaptive encoder memory configured to store a defined data structure.

6. The method of claim 1, further comprising:
    performing adaptive excitation synchronization based upon, at least in part, a final decision flag decision generated by the adaptive coding algorithm.

7. The method of claim 2, further comprising:
    disabling a post-processing option including a high-pass filter in a partial decoder, wherein disabling is configured to avoid codec tandeming.

8. A system for reducing tandeming effects in a communications system, the system including at least one processor configured to perform operations comprising:
    receiving an incoming initial audible audio speech signal from a user at a speech encoder;
    receiving, at a speech decoder, an input bitstream associated with the incoming initial audible audio speech signal from the speech encoder;
    determining, at the speech decoder, a decoded signal based on the received input bitstream;
    determining whether or not coding is required, wherein determining whether or not coding is required comprises comparing an excitation signal constructed using the decoded signal to a previous optimized final version of the excitation signal from a previous frame;
    upon determining that coding is required,
        modifying the excitation signal associated with the input bitstream;
        providing the modified excitation signal to an adaptive encoder;
        calculating a new excitation signal e1($n$) for a new speech signal s(n) after Voice Quality Assurance ("VQA") processing has been performed, wherein VQA processing is performed on the decoded signal prior to providing the signal to the adaptive encoder;
        calculating a total excitation signal e2($n$) for the decoded signal sp(n) before VQA; and
        deciding whether the decoded signal from the speech decoder is copied to an output of the adaptive encoder using an adaptive coding algorithm, by calculating a distance over signal ("DOS") ratio "R" between the new excitation signal e1($n$) and the total excitation signal e2($n$); and
        encoding the modified excitation signal at the adaptive encoder, and transmitting the encoded modified excitation signal with the decoded signal based on deciding that the decoded signal is to be copied.

9. The system of claim 8, further comprising:
    decoding T-milliseconds codec frames of the input bitstream that was encoded by a code excited linear prediction ("CELP") based encoder at a rate of S kilobits/second for an adaptive encoder.

10. The system of claim 8, further comprising:
    calculating a total excitation signal u(n) by adding an adaptive and a fixed codebook vector, each scaled by a respective gain.

11. The system of claim 10, further comprising:
saving the total excitation signal u(n) at an adaptive encoder memory, wherein at least one of the adaptive codebook vector and the fixed codebook vector include speech frames and discontinuous transmission ("DTX") frames based on a CELP-based standard.

\* \* \* \* \*